Dec. 25, 1928.

J. J. GILBERT 1,696,230

ELECTRICAL PILOTAGE

Filed June 30, 1923

2 Sheets-Sheet 1

Inventor:
John J. Gilbert,
by C.A. Sprague, Atty.

Dec. 25, 1928.

J. J. GILBERT

ELECTRICAL PILOTAGE

Filed June 30, 1923

Fig. 4.

A - Closed Structure of Armor Wires

B - Open Structure of Armor Wires

Percentage of Return Current Carried by Armor Wires

Freq. Cycles per Sec.

Fig. 5.

Magnetic Field Intensity $100 \times 10^{-6}$

Magnetic Field Intensity at 100 ft. from Cable

Open Arrangement of Armor Wires
Closed Arrangement of Armor Wires

Freq. Cycles per Sec.

Inventor:
John J. Gilbert,
by C. E. Sprague Atty.

Patented Dec. 25, 1928.

1,696,230

UNITED STATES PATENT OFFICE.

JOHN J. GILBERT, OF PORT WASHINGTON, NEW YORK, ASSIGNOR TO WESTERN ELECTRIC COMPANY, INCORPORATED, OF NEW YORK, N. Y., A CORPORATION OF NEW YORK.

ELECTRICAL PILOTAGE.

Application filed June 30, 1923. Serial No. 648,689.

For the purpose of guiding ships through channels there has been employed a means of electrical piloting, the principle of which is essentially as follows: A submarine cable, constructed in the ordinary manner, is laid along the bottom of the channel and connected at one end to ground and at the other end to a generator by means of which audio frequency currents are transmitted along the cable. The field due to the current in the cable induces electromotive forces in coils which are located on ship board, and by comparing the electromotive forces in the various coils the position of the ship relative to the cable can be determined.

An object of the present invention is to increase the magnitude of this field. This is done, first, by improving the transmission characteristics of the cable, which determine the magnitude of the current in the cable at any point, by making the length of the cable equal to a multiple of the half wave length of current therein or by loading the cable or by both of these means; and second, by modifying the structure of the sheath of armor wires, which determine the distribution of the return current in the water and the value of the magnetic field at a given distance from the cable.

Figure 1:
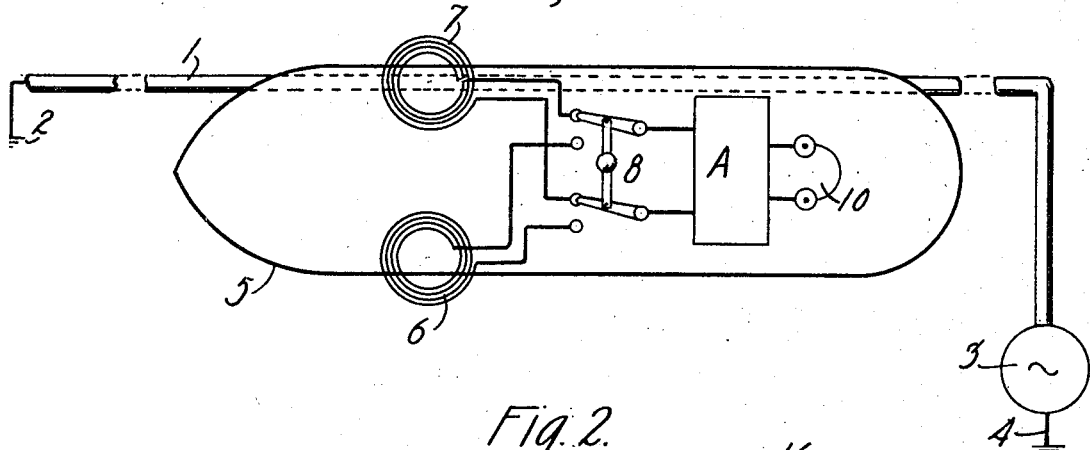
Figure 2:
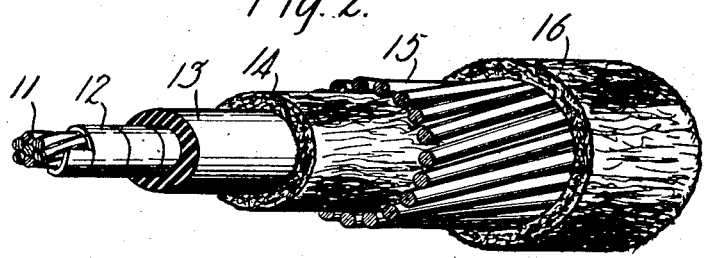

Referring to the drawings, Fig. 1 illustrates diagrammatically a cable and source of alternating current arranged, according to the present invention, for guiding the ship, which is provided with suitable receiving apparatus. Fig. 2 is a detailed view of a submarine cable which is loaded and armored in accordance with the present invention. The curves in Figs. 3, 4 and 5 have been labeled to indicate what they represent. They will be referred to in detail later on.

Referring in detail to Fig. 1 of the drawings, a submarine cable 1 loaded and armored as hereinafter explained, is connected at one end to the ground 2 and is in circuit with a source of alternating current 3, the frequency of which is chosen as hereinafter explained. The generator 3 is grounded at 4, as usual, to provide a return path for the currents through the water. The ship 5 is provided with the usual coils 6 and 7, which are connected by means of the reversing switch 8 to any suitable detecting and amplifying apparatus A, which supplies the detected and amplified currents to the receivers 10.

Consideration will now be given to the determination of the transmission characteristics of the cable and to the structure of the armor. Other things being kept constant, the electromotive force observed on shipboard is directly proportional to the current in the adjacent section of the cable. This current can be increased by a suitable degree of inductive loading, which may be calculated as hereinafter explained, the amount of loading required to obtain the maximum effect depending upon the length of the cable and upon the frequency.

The amplitude of the current at the distance $x$ from the sending end of a cable $s$ nautical miles in length, grounded at the distant end, can be calculated from the formula, $$I = \frac{V_0}{Z_0} \frac{\cosh \gamma(s-x)}{\sinh \gamma s} \quad (1)$$

where $Z_0$ = the characteristic impedance of the cable, $\gamma = \alpha + j\beta$ = the propagation constant of the cable, $V_0$ = the input voltage. The components of the propagation constant are calculated from the formulæ:

$$\alpha = \sqrt{\frac{pc}{2}[\sqrt{R^2+p^2L^2}-pL]+\frac{1}{2}RG}$$

$$\beta = \sqrt{\frac{pc}{2}[\sqrt{R^2+p^2L^2}+pL]-\frac{1}{2}RG}$$

R, L, G and C being respectively the resistance, inductance, leakance and capacitance per unit length.

Equation (1) gives for the current at the distant end the value $$I_s = \frac{V_0}{Z_0 \sinh \gamma s} = \frac{2V_0}{Z_0[(\epsilon^{\alpha s}-\epsilon^{-\alpha s})\cos \beta s + j(\epsilon^{\alpha s}+\epsilon^{-\alpha s})\sin \beta s]}$$

It is evident that $I_s$ reaches its maximum value when $\beta s = n\pi$ and $\alpha s = 0$, that is, when the length of cable is a multiple of one-half wave length and the total attenuation is zero. Although this limit of zero attenuation is unattainable in practice, we may approach it by sufficiently increasing the inductance of the cable to reduce the attenuation, and at the same time maintain the wave length relationship without unduly increasing the impedance of the cable. A specific example of how these variables are chosen is given later on.

Figure 3:
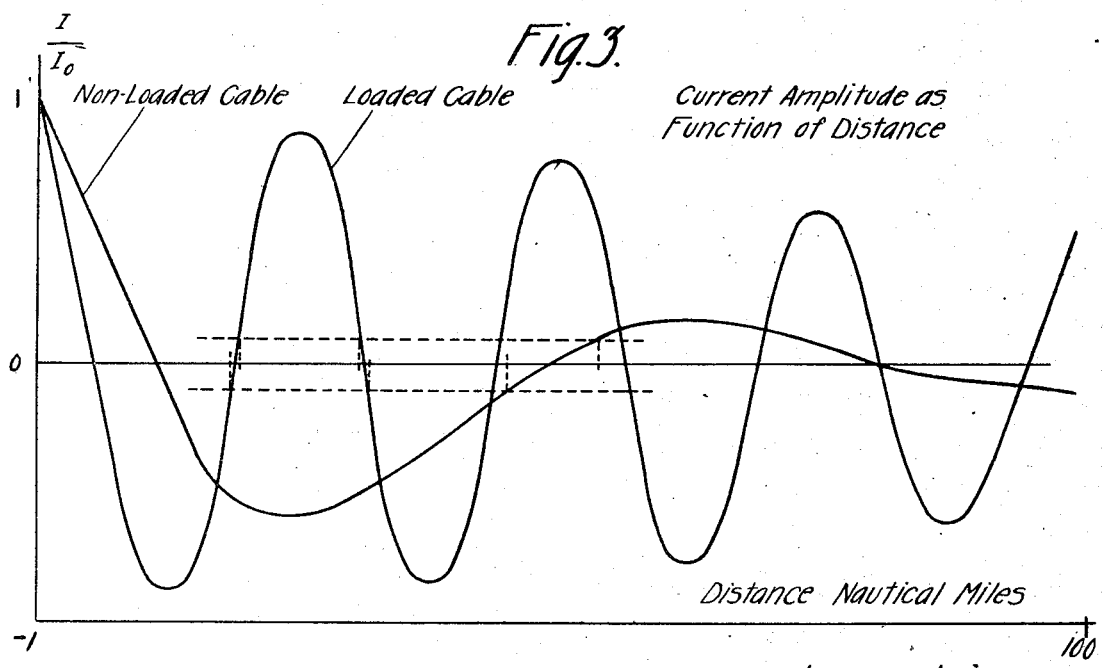

The variation of current amplitude along a cable, expressed as a fraction of the input current, is shown in Fig. 3 for two cables, each 100 nautical miles in length. One cable is of the ordinary non-loaded type. The other is identical in structure, except that some of the copper of the core conductor has been replaced by a layer of high permeability material, thus increasing the inductance per unit length of the cable. As developed mathematically above, standing waves are produced on a cable whose distant end is grounded or otherwise terminated so as to produce reflection effects. The diagram shows instantaneous values of the current at the time of maximum amplitude and over a complete cycle the current will decrease to zero, rise to the maximum value in the opposite direction and again assume the value shown. But these periodic changes will only occur at fixed points spaced by half a wave length along the cable and at the intermediate nodal points practically no current will ever flow. Hereafter in the specification the points of maximum and minimum current flow will be referred to as current loops and nodes, respectively. Comparison of the curves in Fig. 3 indicates two points of superiority of the loaded cable; first, the larger value of current amplitude at points on the cable remote from the generator, and second, the shorter length of the "silent zone," indicated by the dotted lines in the figure, in which the current amplitude is less than the value required to give recognizable effects on shipboard.

The number and location of the current loops along the cable may be controlled by the degree of loading and by the choice of frequency. Thus, if at particular points in the channel, it is desired to obtain a maximum effect in the detecting apparatus the cable can be designed to give current loops at those points. The increased current amplitude that results from loading will be found of great advantage where long cables (more than 100 nautical miles) are to be employed, for the purpose, say, of outlining a strip of coast.

The following applies in the choice of a loading inductance to be employed in any particular case. The fundamental equation is $$\beta s = n\pi \quad (2)$$

where $\beta$ is defined by the equation $$\beta = p\sqrt{LC} \quad (3)$$

which is a very close approximation for the formula given above. The loading inductance is therefore determined by the equation $$L = \frac{n^2 \pi^2}{C p^2 s^2} \quad (4)$$

This inductance can be obtained by a number of choices of thickness and permeability of loading material, as is indicated by the formula $$L = \frac{7.42 \times 10^{-4} \mu t}{d} \quad (5)$$

where $\mu$ is the permeability of the loading material, $t$ is the thickness of this layer and $d$ is its mean diameter on the conductor. L is the inductance in henries per nautical mile. From mechanical considerations and because of the fact that eddy currents in the loading material contribute to the effective resistance of the conductor and therefore increase the attenuation, a certain set of values of $\mu$ and $t$ will be found to be most suitable for obtaining a given value of L; and these will be designated as the optimum values of these quantities. The eddy current resistance is determined by the formula $$R_e = k \frac{\mu^2 t^2 t^3}{d} \quad (6)$$

where $k$ is a constant depending upon electrical characteristics of the loading material and its geometric form.

The quantity $n$ is the number of half wavelengths contained in the entire length of cable. The choice of this quantity may be regulated to a certain extent by the nature of the course of the cable. Thus if it is particularly desirable to mark out certain parts of the course to a greater degree than other parts, it will be desirable to select $n$ so that the loops of current will be located at the desired points. In this same connection it may be found desirable in certain cases to impress simultaneously on the cable two or more different frequencies corresponding to different values of $n$. Because of the fact that the loops of current for the various frequencies are differently located, the characteristic tone at any point of the cable might be used as an additional means of marking.

By taking various values of $n$ we arrive at a number of values of loading inductance according to formula (2), which will give the desired wave-length characteristic. The attenuation constants of these various values of L will differ among themselves owing to the fact that various optimum permeabilities and thicknesses of loading material have been employed. This will serve as another factor influencing the choice of loading inductance; since other things being equal, the value of L corresponding to the smallest attenuation constant would be the most desirable one to employ.

There is still a third factor of influence upon our choice, namely, the fact that the inductance of the cable influences the characteristic impedance of the cable, as indicated by the formula $$Z_0 = \sqrt{\frac{L}{C}} \quad (7)$$

A large value of inductance increases the characteristic impedance, and this has the effect of decreasing the current, as is shown by formula (1). This effect, of course, can always be overcome by increasing the impressed voltage, but this calls for increased power.

It is found that the optimum values of permeability described above are higher than those that can be obtained by the use of ordinary material such as iron. They can, however, be easily obtained by the use of an iron nickel alloy, which as described and claimed in G. W. Elmen application, Serial No. 557,928, May 2, 1922, is composed preferably of 78½ per cent nickel and 21½ per cent iron though other proportions may be used. The permeability of this alloy at small magnetizing forces of the order of 0.001 to 0.10 gauss has been found to be from ten to twenty times that of iron, that is, from 1000 to 6000. Any other suitable loading may be used however.

In Fig. 2 of the drawings the stranded electrical conductor 11, which may be of copper and from 100 to 200 mils in diameter, is illustrated as having a spiral wrapping 12 of iron nickel alloy, which may be 3 to 10 mils thick and from 20 to 200 mils wide, although other dimensions may be used, and which may comprise one or more layers. It is pointed out in the above noted application that iron nickel tape is wrapped while cold on an electrical conductor, and is later treated by heating the taped conductor to a temperature of about 850° C., maintaining it at that temperature for a few minutes to insure a uniform temperature throughout, then cooling slowly to a temperature of about 600°, which is just above the critical or transition temperature of the alloy, that is, the temperature at which the magnetic properties disappear on heating and reappear on cooling; and finally cooling from that temperature more rapidly but at a definite rate dependent upon the ratio of nickel to iron in the alloy. This rate can be easily determined by trials. A convenient method of securing the desired rate of cooling has been found to be a rapid withdrawing of the material from the furnace when it has reached the temperature of 850° C. into a blast of air or inert gas which is controlled to secure the desired rate of cooling. The necessary cooling will always be at a rate intermediate that required for annealing and that at which such internal strains would be set up as to lower the permeability below the desired value.

After the taped conductor has been heat treated, as indicated above, it is provided with a coating 13 of gutta percha or the like and a coating 14 of jute or the like, on top of which is laid the armor 15 comprising wires or bars, which are spaced apart for reasons described in detail below. On top of the armor 15 one or more coatings 16 of jute or the like may be used.

Regarding the second controlling factor, the effect of the structure of the sheath upon the current distribution in the sea water, a study of the general problem of submarine cable transmission shows that at audio frequencies the return current in the sea water and armor wires is concentrated, to a large degree, in the neighborhood of the core, and that the degree of concentration depends upon the frequency, and upon the structure and the material of the armor wires. This is shown in the curves of Fig. 4 which gives the percentage of current carried by the armor wires for a submarine cable in which two arrangements of armor wires are employed. In the closed arrangement the armor wires are laid on the jute in such a manner that adjacent wires are in contact. In the open arrangement there is an interval, amounting to a fraction of the diameter of an armor wire, between adjacent wires.

The magnetic field intensity in the water at any distance from the cable can be calculated by rigorous analytical methods and is expressible in the form $$H = \left[ \frac{\alpha}{\mu j p} A K'_0(\alpha r) + {}_{s=0}\sum^{\infty} (-\alpha)^s B_s {}_{n=1}\sum^{N} K'_s(\alpha \rho_n) \cos \Phi_n \right]$$

where $r$ and $\rho_n$ are, respectively, the distances of the point from the cable core and from a particular armor wire designated as the nth; $\Phi_n$ is the relative orientation of the point and nth wire as seen from the core; $\mu$ and $\lambda$ are, respectively the permeability and the conductivity of the armor wires; N is the number of armor wires; $K'_s$ is the derivative of the Bessel function of the second kind and of the Sth order; A and $B_s$ are constants, and $\alpha$ is defined by the relation, $$\alpha = \sqrt{-8\pi^2 \lambda \mu f j},$$

in which $j = \sqrt{-1}$ and $f$ is the frequency. The magnetic field intensity at a point 100 feet from the cable for both the open and closed arrangement of armor wires previously described are given in the curves of Fig. 5 as function of the frequency. It is obvious that the open arrangement of armor wires is superior for the purpose which we are discussing, in that it permits the return current to penetrate the armor sheath and to escape into the surrounding water.

Still greater improvement in this respect can be obtained by dispensing with armor wires entirely and obtaining the required mechanical protection by a heavy layer of jute.

The current in the sea water is then able to spread through a much larger cross section with resultant increase in the value of the electric and magnetic fields at all points. For the same reason, the resistance of the cable circuit is much less in this case, and the current at all points in the cable will therefore be increased, thus further increasing the field intensities. Therefore, the arrangement for the purposes of electrical piloting preferably consists of a central insulated core, loaded continuously with high permeability material, surrounded by a layer of jute or other non-magnetic and poorly conducting material to give the required mechanical protection.

What is claimed is:

1. A magnetically loaded submarine piloting cable having one end terminated in an impedance of value relative to the characteristic impedance of the cable such that electric waves are reflected therefrom, and means for supplying alternating current to the other end of the cable, the length of said cable being a multiple of one half wave length of the electrical waves supplied by said means.

2. The method of obtaining a maximum external magnetic field at a particular longitudinal point on a pilot cable which comprises so terminating the cable as to produce reflected electric waves, applying an exciting E. M. F. to a circuit including the pilot cable and so regulating the frequency of the exciting current with respect to the inductance and length of the cable as to produce a current loop at said longitudinal point.

3. A piloting circuit comprising a magnetically loaded submarine piloting cable having one end connected directly to ground, and means for applying alternating current to the other end of the cable of such frequency that the length of said cable is a multiple of one-half the wave length of the electrical wave supplied by said means.

4. A piloting circuit comprising an electrical conductor continuously loaded with magnetic material throughout at least that portion of its length where it is desired to produce an external electromagnetic field.

In witness whereof, I hereunto subscribe my name this 27th day of June A. D., 1923.

JOHN J. GILBERT.